May 4, 1954
B. M. HYMAN
2,677,226
COTTON STRIPPING MECHANISM
Filed Sept. 22, 1951
3 Sheets-Sheet 1
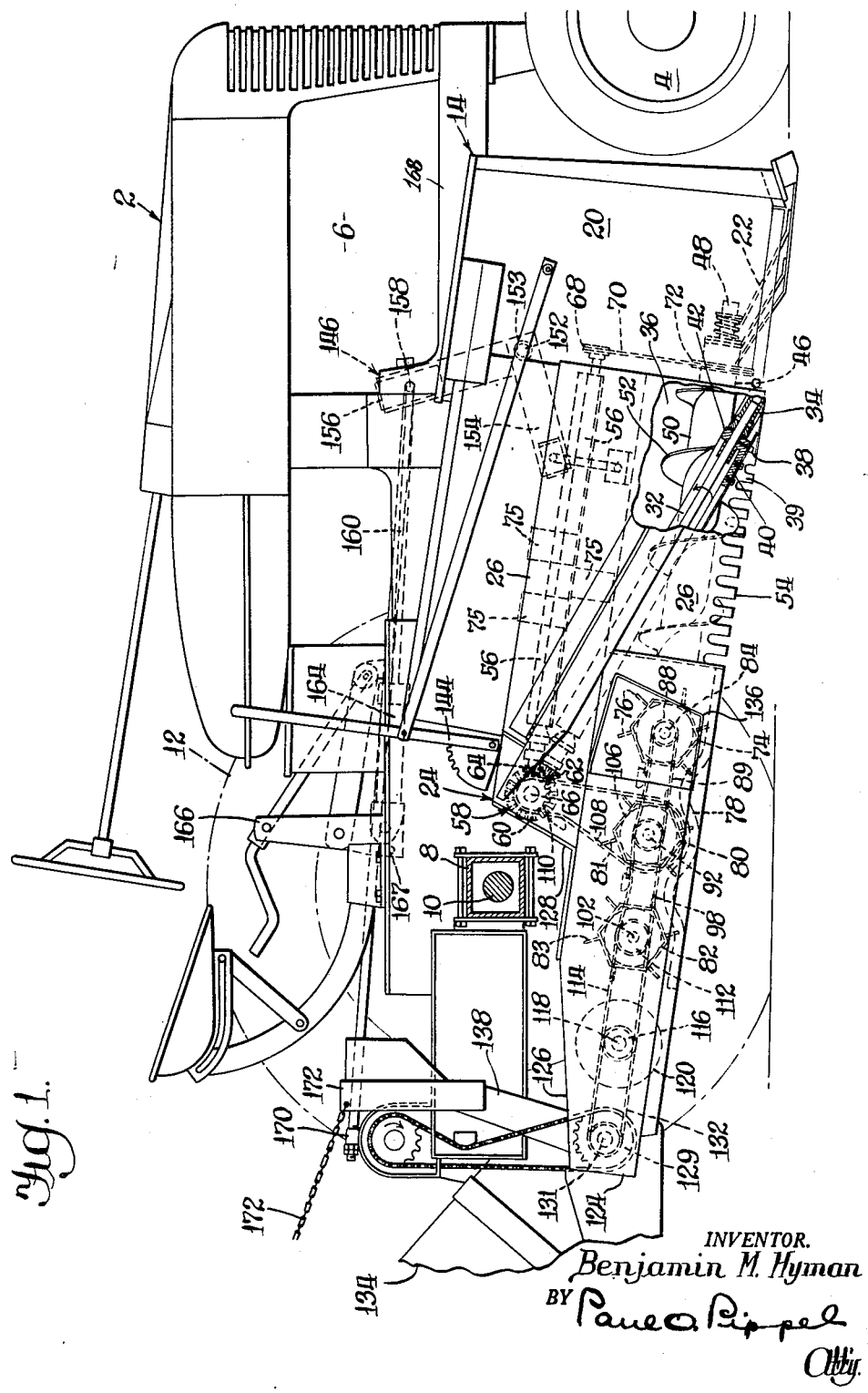
INVENTOR.
Benjamin M. Hyman
BY Paul O. Pippel
Atty.

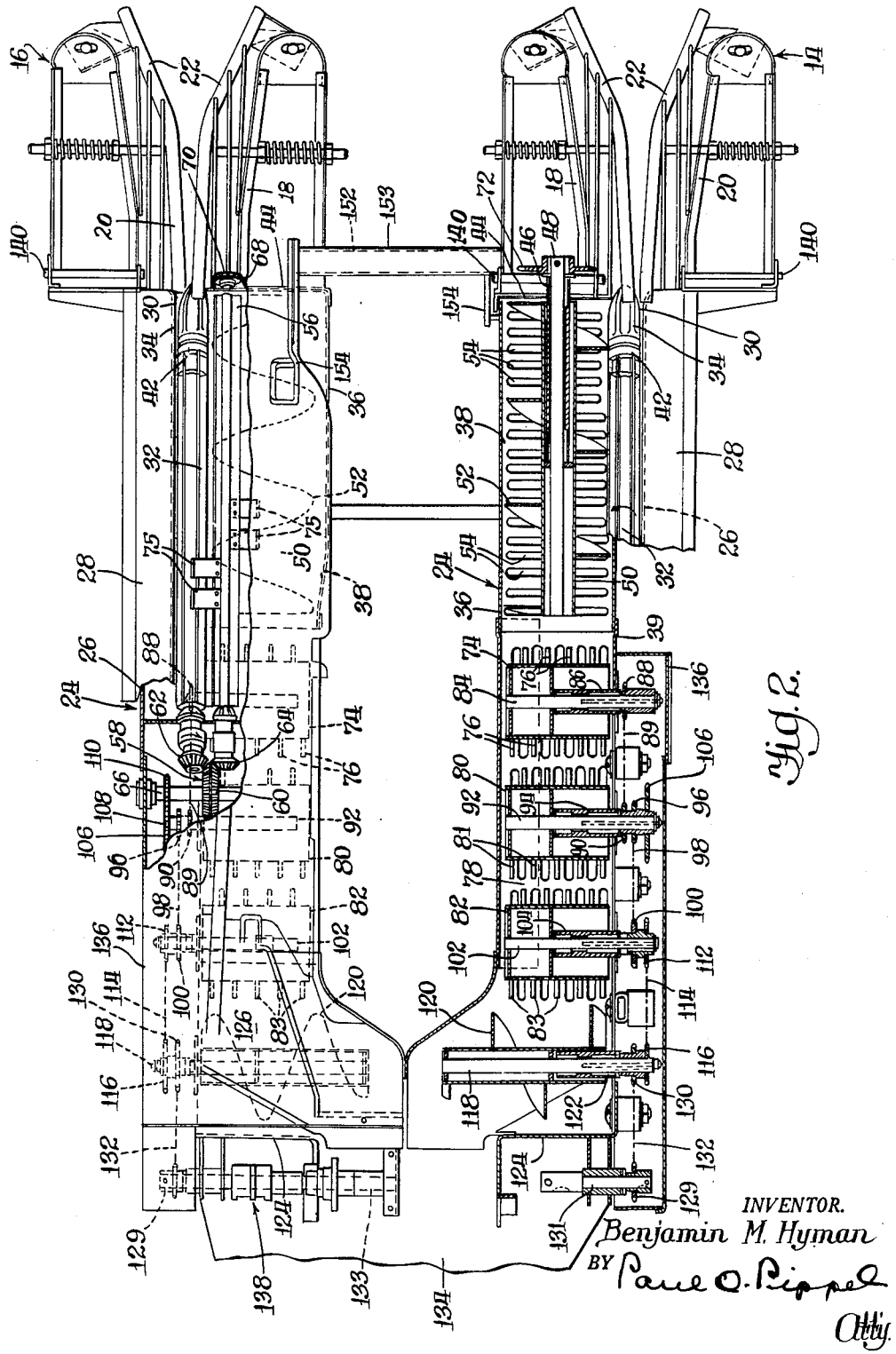

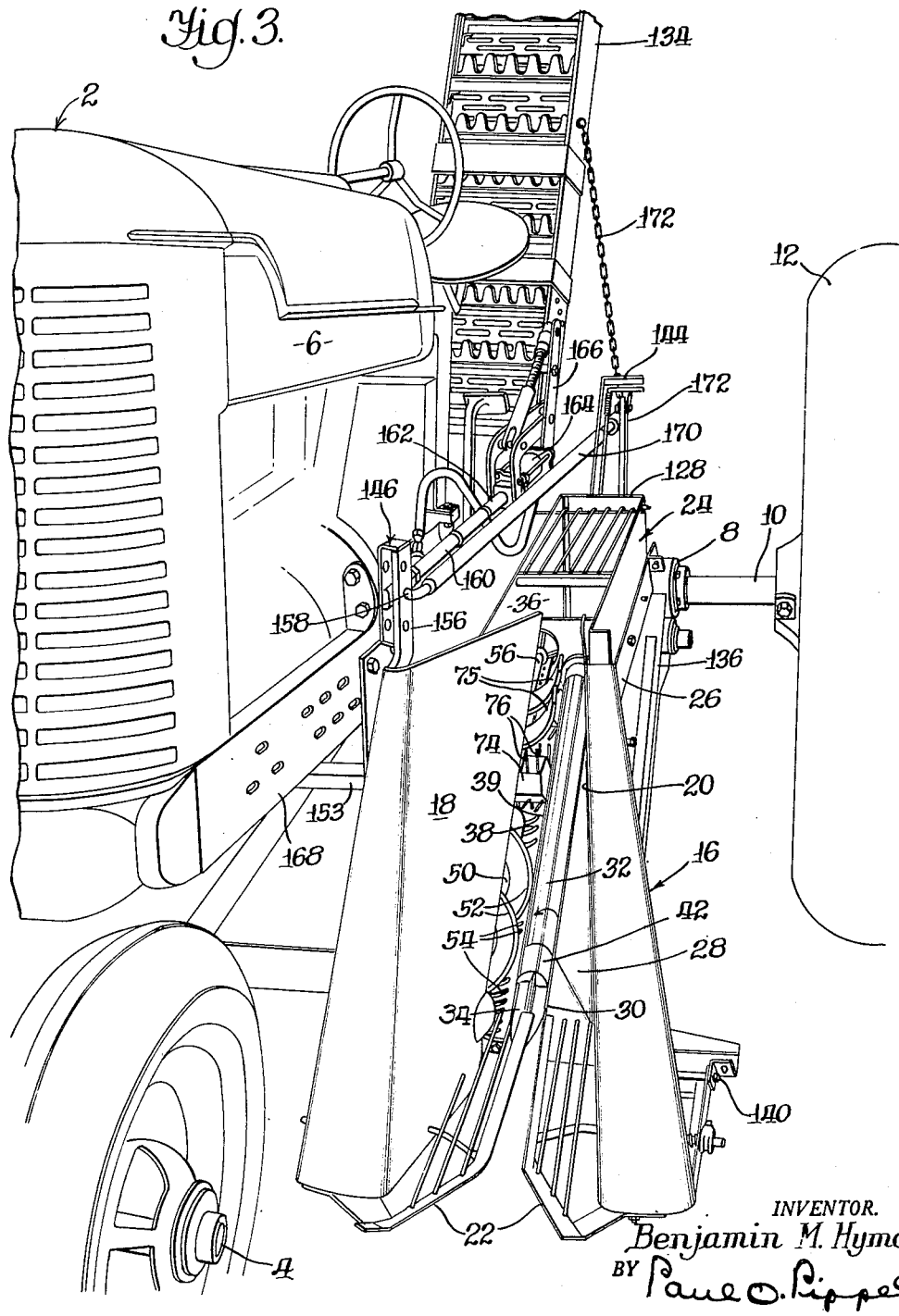

Patented May 4, 1954

2,677,226

UNITED STATES PATENT OFFICE 2,677,226

COTTON STRIPPING MECHANISM

Benjamin M. Hyman, Moline, Ill., assignor to International Harvester Company, a corporation of New Jersey Application September 22, 1951, Serial No. 247,847

16 Claims. (Cl. 56—29)

This invention relates to cotton harvesters and more specifically to cotton strippers.

Such stripping machines are adapted to operate primarily on dry, crisp, fully matured plants after the leaves on the plants have been partially removed by frost or application of chemicals and in general comprise combs, stripping rollers or equivalent structure designed to glean the cotton bolls from the plants as they pass through the mechanism. The machines, of course, are not discriminating and crush and break off many of the brittle plant stems which are then commingled with the lint-filled bolls. It is highly desirable to separate this trash from the bolls as rapidly as possible to avoid contaminating the lint and thereby reduce the trash content when delivered to the gin mill.

A general object of the invention is to provide a stripping machine which will effectively and quickly sift out the trash.

A further object is to provide such a machine incorporating a novel combination conveying and beating assembly which comprises several components the initial of which obtains large capacity with minimum agitation of the crop and surrounding dust laden air and the succeeding components being designed to advance and tumble the crop in increments in constantly accelerating stages along a suitable grating so that each increment is spread out and deposited at each stage upon clear grating thereahead.

A more specific object is to provide a conveyor mechanism having an auger as an advance unit discharging to a beater cylinder which flings the trash laden crop along a grating to another beater which picks up faster than the discharge of the first beater, the second beater throwing to a third which gathers faster than the second delivers and so forth until the crop is cleaned and conveyed to a suitable conveyor or wagon.

A different object is to devise a novel conveyor system with provision to establish a more uniform flow therethrough.

In this connection the invention contemplates the location of an auger with a beater therebehind within the inlet opening of the conveyor, the auger, which extends along the fore section of the stripping means provides the high capacity necessary to accept the bulk of the crop, and the beater at the rear extremity of the opening functions upon the crop deposited thereon directly from the stripper to scatter it into the auger thereahead so that choking at the discharge end of the auger is eliminated and a more uniform flow of the crop from the auger to the underside of the beater is obtained. In addition, the top side of the beater flays and pulverizes the trash from the cotton. This dual action of the beater effects maximum utilization thereof and its location at the rear extremity of the inlet in combination with the screening plants entering the forward extremity of the stripper insures that the scattering mass will deposit into the auger and not be thrown out of the front end of the unit.

A further object is to locate the conveyor means on the inboard side of each harvester unit in a position to conveniently admit it beneath the waist of the supporting tractor to afford maximum lateral adjustment for the units and also compact the assembly.

A corollary object is to devise cotton stripping units which permit a balanced arrangement at opposite sides of a supporting tractor to obtain a stabilized assembly.

A different object is to correlate regions of different aggressiveness of the stripper with conveyor sections of corresponding capacity.

These and other objects of the invention will become more apparent from the specification and the drawings, wherein:

Figure 1 is a side elevational view with parts broken away and shown in section of the mechanism shown mounted on a tractor.

Figure 2 is a fragmentary top plan view with parts broken away and shown in section of the harvesting units at opposite sides of the tractor, and Figure 3 is a perspective view of the left harvesting unit shown as mounted on the tractor.

Describing the invention in detail, the tractor generally designated 2 is of conventional design including a narrow forward steering truck 4 which supports the front end of the tractor body 6 which is carried at its rear through axle housings 8, 8 extending laterally outwardly from opposite sides thereof, from driving axles 10, 10 which are connected to traction wheels 12, 12.

Right and left cotton stripper units designated generally respectively 14 and 16 are disposed alongside the opposite sides of the tractor body.

Each unit 14 or 16 includes inboard and outboard divided components 18 and 20 at its forward end, each component yieldably supporting at its lower end a plant-lifter grate 22. The associated components 18 and 20 converge rearwardly, and vertically are preferably, although not necessarily, taller than the cotton plants in which the mechanism is adapted to operate. The divided components 18 and 20 form the leading portion of the throat of each stripper unit and open at their rear into a housing generally designated 24 which contains plant processing mechanism. The housing 24 constitutes an ambulant frame and comprises an outboard portion including a substantially vertical panel or side wall 26 which mounts on its inner side a stripper plate or elongated wall portion 28 inclined downwardly inwardly away from panel 26 and at its inner edge forms a plant passageway or throat 30 alongside and in parallelism with an opposing stripper roll 32 which is inclined upwardly rearwardly from its forward pointed nose 34. The roll 32 and plate 28 constitute stripper means or gathering members. The stripper plate 28 is yieldably mounted on the panel 26 and is movable toward and away with respect to the stripper roll in order to accommodate plants of varying volume through the passage 30. It will be understood that the roll or rotor 32 may have rigid, brush or rubber or other yieldable vanes.

The inboard side or portion of the housing component 24 comprises a substantially vertical inboard panel or side wall 36 which at its lower end is turned inwardly to form a substantially semi-cylindrical upwardly open trough or inlet opening 38. The inner edge panel 39 of the trough provides a connection to a bracket 40 (Fig. 1) of a bearing 42 which journals the stripper roll 32 adjacent to the nose 34 thereof.

The forward extremity of the trough receptacle is closed by a substantially vertical wall or panel 44 which extends inwardly from the forward edge of the inboard panel 36 of the housing. The panel 44 carries a bearing 46 (Fig. 2) which rotatably supports a shaft 48 carrying an auger or fore conveying component 50 rearwardly of the panel 44 within trough 38. The auger or conveyor section 50 which is the first or head end of the combination conveying and cleaning means is provided with fins or helicoids 52 and is rotated in a direction advancing the crop rearwardly in the trough 38 along the bottom grating thereof which is provided with a plurality of transverse slots 54, 54. These slots are intended to screen or sift out some of the trash which is accumulated with the cotton bolls which have been gleaned from the plants passing through the plant passageway 30 pursuant to rotation of the stripper roll while the plant is compressed against the stripper plate. The rotation of the stripper roll is in the direction as shown by the arrow (Figs. 1 and 3).

It will be seen that the auger conveyor or forward conveyor section extends from the forward end of the elongated stripper roll or instrumentality to an area intermediate the ends of the stripper roll and that it is positioned generally horizontally with a very slight rearward inclination and is formed with an open discharge end at its rear extremity and solely supported from the panel 44 which above the auger also rotatably supports the forward end of a plant beater roll or rotor structure 56, the beater roll extending generally horizontally above the stripper roll and being driven at its rear extremity together with the rear extremity of the stripper roll through a gearing 58 as shown in detail in my companion U. S. application entitled, "Cotton Stripping Machine" and filed September 9, 1950, Serial No. 184,068, now Patent 2,654,201. The gearing comprises a double crown pinion 60 entered between pinions 62 and 64 on the inner ends of stripper roll 32 and beater 56, respectively and meshing therewith.

The pinion 60 is constrained for rotation with a cross-shaft 66 which is suitably journaled through bearings on the associated panel 26 and an upper extension at the rear end of the panel 39.

The forward extremity of the beater 56 is connected to a sprocket 68 which drives a chain 70 trained about sprocket 72 keyed to the forward end of the auger shaft 48 which is disposed on a fore and aft axis.

The auger is serially arranged with and discharges to a transverse beater cylinder or tumbler or rearward conveyor section or component 74 disposed adjacent to the rear extremity of the auger. The cylinder or intermediate conveyor section 74 comprises a plurality of outstanding fingers or flays 76, 76 which are adapted to strike the crop delivered by the auger 50 and propel the same therebeneath along a grating 78 forming an extension of the bottom of the trough. It will be noted that the serpentine grating 78 is slotted longitudinally of the conveying mechanism and is formed with sinusoidal convolutions which crest intermediate the beater or transfer cylinder element 74 and the succeeding beater cylinders or tumblers 80 and 82 which are serially arranged and spaced rearwardly of cylinder 74, generally parallel thereto.

Cylinder 74 constituting the aft conveyor component is carried by a generally horizontal shaft 84 (Fig. 2) rotatably mounted within a bearing 86 supported from the panel 39. The shaft 84 is keyed to a sprocket 88 which is disposed outboardly of the panel 39 and driven by a chain 89 trained about a sprocket 90 constrained for rotation with a shaft 92 which is connected to cylinder 80, the shaft 92 being rotatably mounted within a bearing 94 carried by the panel 39. The shaft 92 is also connected to a sprocket 96 disposed outboardly of the sprocket 90 and driven by a chain 98 which meshes with a sprocket 100 keyed to a shaft 102 which provides the rotational axis for the cylinder 82 to which it is keyed. The shaft 102 is journaled within a bearing 104 carried by the panel 39.

The shaft 92 of the preceding beater is also keyed to a sprocket 106 disposed outboardly of sprocket 96 and driving the chain 108 which is trained about a sprocket 110 keyed to the shaft 66 whereat power is transmitted to drive the beater roll 56 and the stripper roll 32 as well as the auger 50.

The shaft 102 of the last beater is provided with a sprocket 112 which is driven by a chain 114 from a sprocket 116 mounted for rotation with a shaft 118 extending generally parallel to shaft 102, the shaft 118 carrying a cross-auger 120 through a bearing 122 mounted on the panel 39.

It will be seen that the rear extent of the housing is closed by a substantially vertical wall 124 which extends inwardly from the panel 39, the lower edge of the wall 124 joining with the rear extremity of the grating 78 and the upper part of the panel 124 being connected to the rear edge of a top panel 126 of the housing, said top panel extending from the rear extremity of the unit beneath the tractor axle housing 8 thereabove and then being bent diagonally, upwardly forwardly to provide the rear panel segment 128 to form with upper extensions of the panels 36 and 39 a suitable compartment for the gearing 58 and to strengthen this area of the housing for supporting the cross-shaft 66.

It will be noted that the sprockets on the outer ends of the cylinders are so arranged as to cause rotation of the cylinder 80 faster than the cylinder 74 and the cylinder 82 faster than cylinder 80. It will be seen that the cylinders or elements 80 and 82 are generally identical to cylinder 74 and are provided with outstanding fingers 81 and 83, respectively and that the fingers 76 on the cylinder element 74 are staggered laterally with respect to the fingers 81 on the cylinder element 80 and fingers 81 are offset laterally with respect to the fingers 83. These fingers may be rigid, brushes or rubber and the like depending upon the action desired. The picking action of the cylinder 74 is arranged to gather faster than the discharge from the auger 50 and the accelerating arrangement spreads the crop so that each increment is deposited and beaten along substantially clear grating thereahead which permits the trash to be sifted out efficiently in successively accelerating stages so that the cotton is delivered in a fairly clean condition to the cross-auger 120.

It will be observed that the arrangement shown is a compact assembly and takes advantage of several natural conditions in that by terminating the auger 50 intermediate the stripper section, the mechanism is correlated with the average crop distribution on the plant such that the greatest volume of crop will have been deposited within the auger mechanism 50 by the time the plant has passed the inner or rear terminus of the auger. In this respect, the high capacity feature of the auger conveyor system 59 is utilized to receive the greatest volume of crop, and the relatively light volume from the upper ends of the plant which may be deposited on the top or first-delivery side of the beater cylinder 74 will not overload it.

It will be noted that the upper side or forward delivery surface of cylinder 74 beats the crop which descends directly upon it from the rear extremity of the stripper roll thereabove, forwardly and scatters it into the auger to prevent bunching of the crop at the discharge of the auger. The disposition of cylinder 74 at the rear end of the conveyor inlet opening permits the cylinder to bat the crop forwardly a considerable distance without throwing it out of the housing. It will be appreciated that the plants entered into the plant passageway 30 will screen the open front end of the unit to prevent the cylinder 74 from batting the crop out of the unit.

The volume of crop discharging directly onto the top side of the cylinder 74 is materially reduced by positioning the most aggressive beater paddles or elements or beating means 75 of the beater roll or rotor structure 56 adjacent to the rear extremity of the auger 50 as seen in Figs. 1 and 2. These paddles 75 may be rigid or formed as brushes or of rubber or the like and extend over the passage and auger. The shortening of the auger assembly 50 also provides space for the three beater cylinders and their arrangement in a generally horizontal row so as to obtain a desired separation of the trash from the cotton.

The cross-auger 120 of each unit is driven by a sprocket 130 keyed thereto which in turn is driven through a chain 132 and sprocket 129 of a transmission system identical with that shown in my copending application for "Cotton Stripping Machine," Serial No. 184,068, filed September 9, 1950. The transmission system includes a cross-shaft 131 and a coaxial jack shaft 133 which also forms a fulcrum for a rearwardly extending elevator 134.

The cross-augers 120 of the respective units 14 and 16 discharge to the elevator 134 which is as explained in my before-mentioned application. The gearing driving the several beater cylinders and the cross-auger of each unit is enclosed within a casing 136 connected to the external side of the associated panel 39.

Each harvesting unit 14 and 16 and the conveyor 134 is connected to a framework generally indicated 138 (Fig. 1), the framework being bolted together about the axle housings 8 and being substantially as shown in my U. S. Patent 2,532,065. The respective units 14 and 16 are pivotal on the coaxial shafts 131 which are carried from the framework.

The forward section comprising the divider components of each unit may pivot on substantially horizontal pins 140 hinging the rear extremities of the components to the forward end of the associated housing. The vertical adjustment of these components may be controlled by a lever and quadrant arrangement 144.

Vertical adjustment of the housing sections of the respective units may be controlled by a lever linkage 146 affording a semi-swingable arrangement for the two locked units laterally, the linkage including a cross-shaft 152 extending through a tube 153 connected to the underside of the tractor body. Each end of the shaft may have a rearwardly extending lever arm 154 pivotally connected to the adjacent housing. The lever arm 154 on the right of the tractor may comprise an upstanding arm 156 which may be pivoted as at 158 to the forward end of the compression member 160, the opposite end of the member 160 telescoping over a piston rod 162 of a hydraulic motor 164 which may be adjustably mounted on an adjusting linkage 166 suitably pivoted as at 167 to the adjacent side rail member 168 of the tractor. The linkage 166 is of conventional design and provides a suitable stop for abutment of the inner end or rear extremity of the compression member 160 to maintain height adjustment of the units. The lever arm 156 may also be pivotally connected through a tension rod 170 through suitable linkage 172 to the elevator 134 whereby raising of the units will elevate the elevator. This arrangement is useful in making a turn to prevent the elevator from striking a trailing wagon hitched to the tractor and which receives from the elevator. The pivoting of the elevator may be substantially as shown in my copending application, Serial No. 206,542 and filed January 18, 1951, U. S. Patent 2,669,821, and entitled, "Lifting Means for Tractor Mounted Equipment."

What is claimed is:

1. In a machine for stripping bolls from field rows of cotton plants, a mobile frame having an elongated side wall with a lower edge and forming a side of a plant row receiving passage, a boll receiving conveyor generally parallel to said wall and forming an opposing side of said passage, said conveyor having first and second sections in generally horizontal alignment longitudinally of said passage, an elongated rotary stripper instrumentality having a forward lower end journalled in said frame adjacent to the lower edge of said side wall and extending diagonally upwardly rearwardly from said front end alongside said passage and having a rear extremity above said second section, said second section having a first delivery side to said first section for delivering bolls received from said rear extremity of said rotary stripper instrumentality to said first section and having a second delivery side receiving from said first section for conveying bolls from the first section to associated receiving means.

2. The combination according to claim 1 and a plant beater rotor structure journalled in said frame above said conveyor on an axis extending lengthwise of the passage and comprising beater elements projecting over said passage and over said first conveyor section.

3. The combination according to claim 1 and said first section comprising an auger having a fore and aft axis of rotation and having a rear discharge end and said second section comprising a beater cylinder mounted on said frame on an axis transverse to said axis of rotation of the auger and immediately therebehind and said first delivery side thereof comprising a top of said cylinder and said second delivery side comprising the bottom of said cylinder.

4. The combination according to claim 1 and said second section comprising a transfer cylinder rotatably mounted on an axis extending transversely of said passage and said first delivery side comprising the top of said cylinder and said second delivery side comprising the bottom of said cylinder.

5. In a cotton crop harvester having row-following gathering means including opposed laterally spaced side portions defining a plant receiving throat therebetween and opposed gathering means supported from respective portions and forming a plant passage therebetween and extending diagonally upwardly rearwardly from the front of said passage and having a rear end at the rear of said passage, a conveyor carried by at least one of said portions and having a first end positioned at the front of said passage extending lengthwise of the passage generally horizontally rearwardly from the front end of said passage in receiving relationship to said gathering means and having a plurality of serially arranged sections aligned longitudinally of the conveyor, at least one of said conveyor sections disposed rearwardly of other of said sections and located entirely below said rear end of said gathering means and having a forwardly moving surface disposed below said rear end of said gathering means in receiving relationship thereto and adapted to deliver crops received from said rear end of said gathering means forwardly to said other of said sections of said conveyor thereahead, and having a rearwardly moving surface for receiving crops from said other sections thereahead and delivering the same rearwardly thereof.

6. The combination according to claim 5 and said one conveyor section comprising a generally horizontal transfer cylinder rotatably mounted on said frame and embodying said forwardly moving surface on its top side and said rearwardly moving surface on its bottom side.

7. The combination according to claim 5 and said sections arranged to operate at progressively increased speeds from said first end thereof toward the opposite end thereof.

8. In a machine for stripping bolls from field rows of cotton plants, a mobile frame having front and rear ends and comprising an upwardly extending side wall having an elongated portion inclining upwardly and rearwardly of said frame to form a side of a plant row receiving passage which is open at the front end of the frame, a boll receiving conveyor extending lengthwise of said elongated wall portion and spaced laterally therefrom to form an opposite side of said passage, an elongated rotor instrumentality journalled in said frame within said passage and having a lower forward end and an upper rear end and extending diagonally upwardly rearwardly in substantial parallelism with said elongated wall portion and spaced laterally therefrom to receive the plants of a row between said wall portions and said instrumentality, said instrumentality being disposed in delivering relation to said conveyor and operable when rotated to knock bolls contacted thereby from plants within said passage, and said conveyor having a plurality of sections aligned generally lengthwise of said rotor instrumentality and arranged in successive boll transferring relationship to each other from front to rear of said harvester, said conveyor having an intermediate section disposed below the rear end of said rotor instrumentality in direct receiving relationship thereto and arranged in boll transferring relationship to the conveyor sections in advance thereof as respects the front of said harvester.

9. In a machine for stripping bolls from field rows of cotton plants, a mobile frame having front and rear ends and comprising a pair of laterally spaced components, boll stripping means carried by respective components in cooperative opposed relation and inclining upwardly and rearwardly of said frame to form a plant row receiving passage therebetween open at the front end of such frame, a conveyor carried by at least one of said components and extending at least the full length of said passage therealongside from the front end thereof at a substantially lesser angle to the horizontal than said boll stripping means and disposed at a lesser elevation than the rearward parts of said stripping means, said conveyor comprising fore and aft sections disposed adjacent to the front and rear of said passage respectively, and said aft section disposed below said rearward parts of said stripping means and having a forwardly delivering portion receiving bolls directly from said rear end of stripping means and delivering said bolls to said fore section and having a rear delivery portion in receiving relation to said fore section for receiving bolls therefrom and delivering the same rearwardly.

10. In a cotton harvesting machine for stripping bolls from field rows of cotton plants having a frame, row-following cotton stripping means carried by said frame and comprising an upwardly and rearwardly inclined roller for stripping bolls from plants passing therealong, conveyor means carried by said frame and extending substantially horizontally rearwardly from the forward end of said inclined roller in a direct boll receiving relationship to the entire length of said inclined roller, said conveyor comprising a forward section and a rearward section immediately therebehind, said rearward section disposed below the rearward end of said inclined roller in a direct boll receiving relationship thereto and in boll transferring relationship to said forward section, said forward section operative responsive to the reception of bolls from said roller to deliver said bolls rearwardly to said rearward section, and said rearward section further operative responsive to the reception of bolls from said forward section to deliver said bolls rearwardly thereof.

11. In a cotton harvesting machine for stripping bolls from field rows of cotton plants comprising a frame, stripper means comprising a stripping roller mounted in an inclined direction on said frame rearwardly and upwardly thereof, a first conveyor mounted to extend in a substantially horizontal direction on said frame from the lower forward end of said stripping roller and in a direct boll receiving relationship thereto, a second conveyor mounted on said frame adjacent the rearward end of said first conveyor below and in a direct boll receiving relationship to said stripping roller, said first conveyor formed to operate to transfer bolls to said second conveyor, said second conveyor formed to operate to transfer bolls received directly from said stripping roller to said first conveyor.

12. The combination according to claim 11 and said second conveyor comprising a generally horizontal transfer cylinder extending crosswise of said stripping roller and having a top side rotating in a direction toward said first conveyor.

13. The combination according to claim 11 and said second conveyor comprising a plurality of rotary generally horizontal transfer elements extending transversely of said stripping roller and mounted upon said frame.

14. The combination according to claim 11 and said first conveyor comprising an auger mounted on said frame on a fore and aft extending axis and disposed in receiving registry with a portion of said stripping roller intermediate its lower forward end and the midpoint thereof, and said second conveyor comprising a beater cylinder rotatably mounted on said frame on an axis generally perpendicular to the axis of rotation of said auger and disposed in receiving registry with a portion of the stripping roller rearwardly of said midpoint and rotatable in a direction moving its top side toward said auger and its bottom side away from the auger.

15. The combination according to claim 14 and said second conveyor comprising at least one other beater cylinder rotatable in the same direction and a faster speed than said first-mentioned cylinder and positioned generally parallel and in receiving relationship thereto.

16. The combination according to claim 11 and a plant beater rotor structure journalled in said frame above said conveyor on an axis extending lengthwise of said passage and having plant beating means rotatable therewith in a path over said passage and said first conveyor.

References Cited in the file of this patent

UNITED STATES PATENTS

| Number | Name | Date |
|---|---|---|
| 1,538,023 | Burton | May 19, 1925 |
| 1,936,748 | Benjamin | Nov. 28, 1933 |
| 1,950,902 | Morse | Mar. 13, 1934 |
| 2,079,547 | Court | May 4, 1937 |
| 2,123,405 | Court | July 12, 1938 |
| 2,406,058 | Boone | Aug. 20, 1946 |
| 2,439,718 | Conrad | Apr. 13, 1948 |
| 2,456,156 | Speck | Dec. 14, 1948 |
| 2,491,777 | Smith | Dec. 20, 1949 |
| 2,533,510 | Roscoe | Dec. 12, 1950 |
| 2,538,166 | Roscoe et al. | Jan. 16, 1951 |